United States Patent
Sakaguchi et al.

(10) Patent No.: US 11,325,428 B2
(45) Date of Patent: May 10, 2022

(54) TIRE

(71) Applicant: SUMITOMO RUBBER INDUSTRIES, LTD., Hyogo (JP)

(72) Inventors: Tetsuya Sakaguchi, Hyogo (JP); Yuichi Ishigaki, Hyogo (JP); Hiroshi Fujita, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 247 days.

(21) Appl. No.: 16/793,446

(22) Filed: Feb. 18, 2020

(65) Prior Publication Data

US 2020/0262251 A1 Aug. 20, 2020

(30) Foreign Application Priority Data

Feb. 19, 2019 (JP) .............................. JP2019-027582

(51) Int. Cl.
*B60C 13/00* (2006.01)

(52) U.S. Cl.
CPC .................................. *B60C 13/001* (2013.01)

(58) Field of Classification Search
CPC ....... B60C 13/001; B60C 13/02; B60C 13/00; B60C 2011/1361; B60C 11/1353
See application file for complete search history.

(56) References Cited

U.S. PATENT DOCUMENTS

| 8,875,763 | B2 | 11/2014 | Paturle | |
|---|---|---|---|---|
| 2004/0187997 | A1* | 9/2004 | Paturle | B60C 13/001 |
| | | | | 152/523 |
| 2010/0051159 | A1* | 3/2010 | Fujioka | B60C 13/001 |
| | | | | 152/523 |
| 2014/0166177 | A1* | 6/2014 | Muhlhoff | B60C 13/001 |
| | | | | 152/523 |

FOREIGN PATENT DOCUMENTS

| JP | 2009-512584 A | 3/2009 | | |
|---|---|---|---|---|
| WO | WO-2016015898 A1 * | 2/2016 | ........... | B60C 13/001 |

OTHER PUBLICATIONS

WO 2016015898 Machine Translation, Behr, Ulrich (Year: 2016).*

* cited by examiner

*Primary Examiner* — Robert C Dye
*Assistant Examiner* — Nicholas J Weiler
(74) *Attorney, Agent, or Firm* — Greenblum & Bernstein, P.L.C.

(57) ABSTRACT

A tire has a visible outer surface comprising a decorative region provided with a plurality of micro-protrusions each comprising a recess and a wall portion. The wall portion surrounds the recess to form a protrusion's apex having an upper surface, and the upper surface of the wall portion comprises at least two peak points in the protruding-height direction of the micro-protrusion, at which the protruding height of the wall portion becomes local maximum.

16 Claims, 7 Drawing Sheets

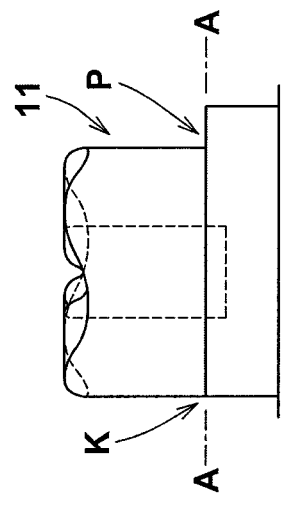
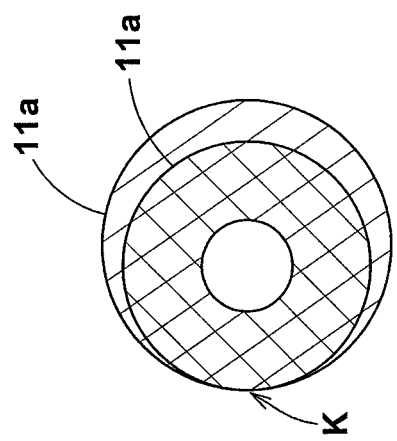
FIG.5A
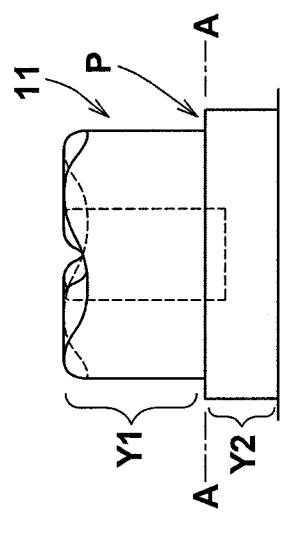
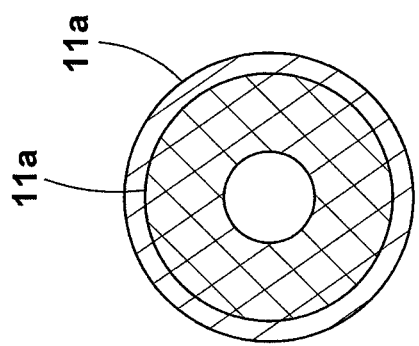
FIG.5B
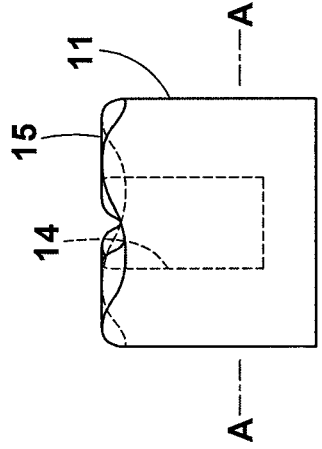
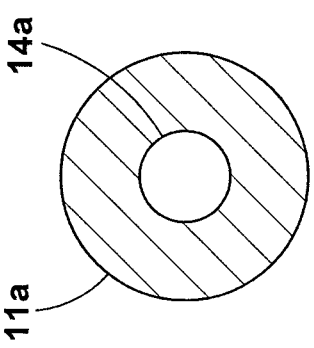
FIG.5C

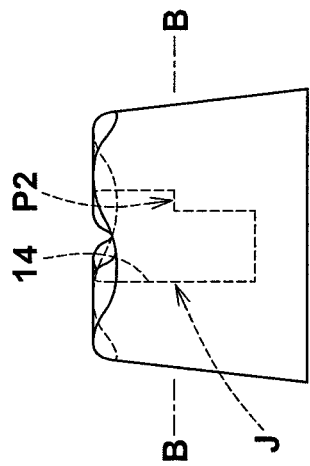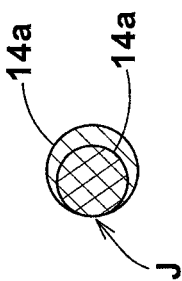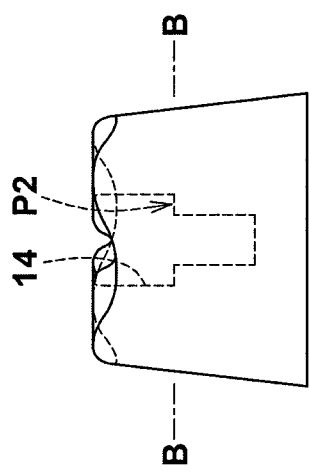

TIRE

TECHNICAL FIELD

The present invention relates to a tire provided with a decorative region.

BACKGROUND ART

Patent document 1 below discloses a tire whose sidewall is provided with a number of tufts in the form of a substantially circular cone. The tufts form a texture to enhance the black color of the tire sidewall, and thereby, contrast with markings, e.g. a name of the tire and the like is increased to improve the visibility of the markings.
Patent document 1: Japanese Patent Application Publication No. 2009-512584

SUMMARY OF THE INVENTION

Problems to be Resolved by the Invention

In recent years, it is required to further increase such contrast in order to further improve the visibility of markings. Therefore, the present invention was made in view of the circumferences as above, and it is an object of the present invention to provide a tire in which visibility of markings and the like can be further improved.

According to the present invention, a tire has a visible outer surface comprising a decorative region provided with a plurality of micro-protrusions each comprising a recess and a wall portion, the above-said wall portion surrounding the recess and forming a protrusion's apex having an upper end surface, and the above-said upper end surface comprising at least two peak points in the protruding-height direction of the micro-protrusion, at which the protruding height of the wall portion becomes local maximum (or relative maximum).

It is preferable that in the wall portion, the peak points alternate in the circumferential direction with bottom points at which the protruding height of the wall portion becomes local minimum (or relative minimum).

The upper end surface of the wall portion may be a surface continuously curved and smoothly connecting the peak points and the bottom points.

The upper end surface of the wall portion may be a polygonally-curved surface made up of surfaces inclined and connecting between the peak points and the bottom points.

It is preferable that, in the decorative region, 2 to 10 micro-protrusions are disposed per 1 sq.mm.

It is preferable that the micro-protrusions include a micro-protrusion whose contour in its transverse section perpendicular to its protruding-height direction is a circle or alternatively an oval.

It is preferable that the micro-protrusions include a micro-protrusion whose contour in its transverse section perpendicular to its protruding-height direction is smaller in its upper end side than its lower end side in the protruding-height direction.

It is preferable that the micro-protrusion whose contour is smaller in its upper end side than its lower end side, comprises a part in the protruding-height direction in which the contour becomes smaller continuously or in a stepwise manner toward the upper end.

In the above-said part at which the contour in the transverse section of the micro-protrusion becomes smaller in a stepwise manner toward the upper end, it is preferable that, at a position at which the contour changes from a larger contour to a smaller contour, a part of the larger contour coincides with a part of the smaller contour.

It is preferable that the contour of the recess in its transverse section perpendicular to its depth direction is a circle or alternatively an oval.

It is preferable that the contour of the recess in its transverse section perpendicular to its depth direction is larger in its upper end side than its lower end side in the depth direction.

It is preferable that the recess comprises a part in which the contour of the recess in its transverse section becomes larger continuously or alternatively in a stepwise manner toward the upper end.

In the above-said part in which the contour of the recess in its transverse section becomes larger in a stepwise manner toward the upper end, it is preferable that, at a position at which the contour changes from a larger contour to a smaller contour, a part of the larger contour coincides with a part of the smaller contour.

It is preferable that the decorative region other than the micro-protrusions comprises a concave-convex surface whose 10-point average roughness (Rz) is in a range from 0.01 to 0.05 mm.

Therefore, in the decorative region of the tire according to the present invention, the light irradiated on the apex of the micro-protrusion is partly absorbed by the recess, and partly reflected by the upper end surface of the wall portion, and the reflected light is diffused by the upper end surface with the peak and bottom points.
Thus, by the synergistic effect of these, it is possible to make the decorative region more matte-black in comparison with micro-protrusions having a circular-truncated-cone-like form not provided with the recess at the upper end.
As a result, the contrast with non-decorative regions which are formed adjacently to or in the decorative region so as to constitute markings and the like, can be increased, therefore, the visibility of the markings is improved.

BRIEF EXPLANATION OF THE DRAWINGS

FIGS. 5A, 5B and 5C each show still another example of the micro-protrusion as a side view (upper side) and a diagram (lower side) showing the contour of the transverse section of the micro-protrusion taken at a position of line A-A of the side view.

FIGS. 6A and 6B each show still another example of the micro-protrusion as a side view (upper side) and a diagram (lower side) showing the contour of the transverse section of the recess taken at a position of line B-B of the side view.

DESCRIPTION OF THE PREFERRED EMBODIMENTS

Embodiments of present invention will now be described in detail in conjunction with accompanying drawings.

Figure 1:
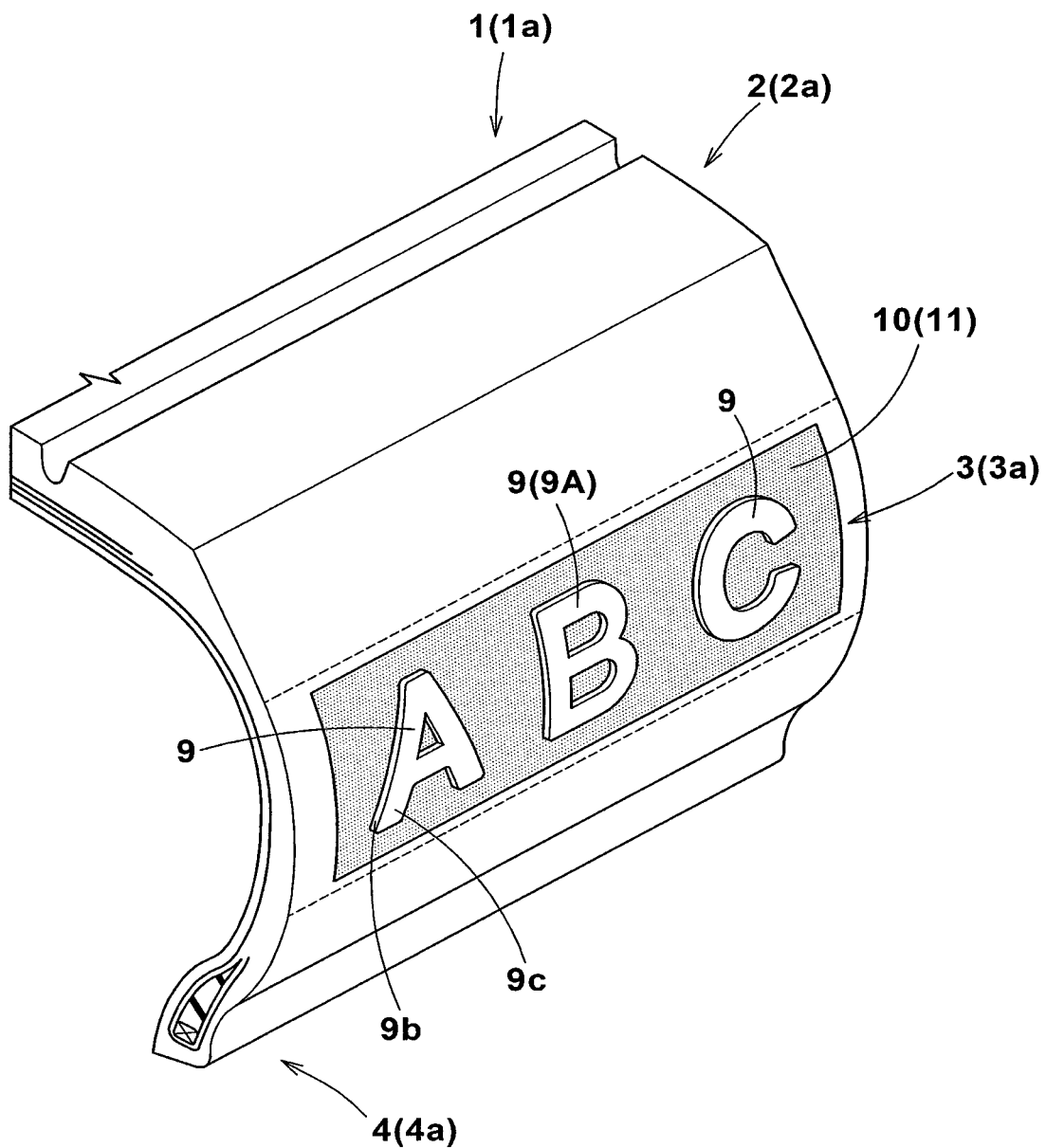
FIG. 1 is a perspective partial view of a tire as an embodiment of the present invention showing a part of a sidewall portion thereof.

FIG. 1 show a tire 1 as an embodiment of the present invention. In this embodiment, the tire 1 is a pneumatic tire for passenger cars. However, the present invention can be applied to various tires including pneumatic tires and non-pneumatic tires for various vehicles including passenger cars, motorcycles, heavy duty vehicles such as truck and bus, and the like.

Here, as well known in the tire art, a pneumatic tire comprises a tread portion whose outer surface defines the tread, a pair of axially spaced bead portions mounted on bead seats of a wheel rim, a pair of sidewall portions extending between the tread edges and the bead portions, a carcass extending between the bead portions through the tread portion and the sidewall portions, and a tread reinforcing belt disposed radially outside the carcass in the tread portion.

The tire 1 has a visible outer surface 1a which is, in this embodiment, defined as that of the tire mounted on a wheel rim (not shown), namely, the visible outer surface 1a includes the outer surface 2a of the tread portion 2, the outer surface 3a of the sidewall portions 3 and the outer surface 4a of the bead portions 4 as shown in FIG. 1.

In the tire 1 in this embodiment, a decorative region 10 and a non-decorative region 9 adjacent thereto are formed in a part of the outer surface 1a.
In this embodiment, the non-the decorative region 9 and the decorative region 10 are formed within the outer surface 3a of at least one of the sidewall portions 3.
However, the non-decorative region 9 and the decorative region 10 may be formed in the outer surface 4a of the bead portions 4, even in the outer surface 2a of the tread portion 2.

The non-decorative region 9 in this embodiment is a raised region 9A raising from the outer surface 3a (or 1a). The raised region 9A is defined by a side surface 9b extending outwardly from the outer surface 3a and a flat and smooth top surface 9c continued from the side surface 9b. Such top surface 9c may reflect the irradiated light and serve to show the non-decorative region 9 brightly.
The non-decorative region 9 is formed as markings which are characters and/or symbols presenting the manufacturer, trade name, size and the like of the tire 1 for example.

Figure 2:
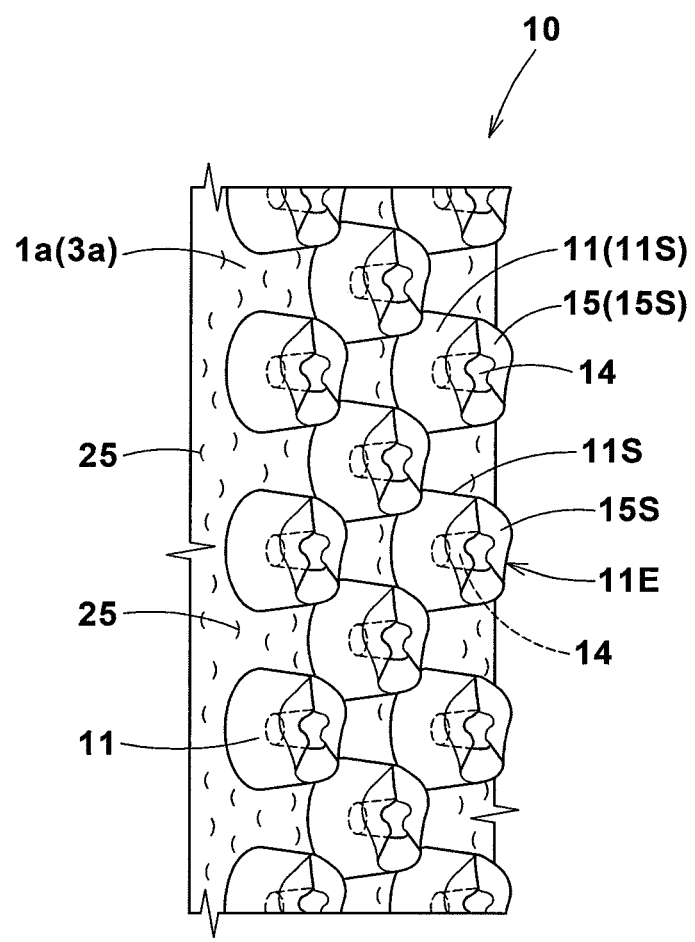
FIG. 2 is an enlarged perspective partial view of an example of the decorative region shown in FIG. 1.

FIG. 2 is a perspective view of a part of the decorative region 10 in FIG. 1.

In the decorative region 10 in this embodiment, the density of the micro-protrusions disposed therein is 2 to 10 micro-protrusions 11 per 1 sq.mm.

In the outer surface 3a, the micro-protrusions 11 protrude axially outwardly therefrom.

At least some of the micro-protrusions 11 are each provided with a recess 14 and a wall portion 15.
The wall portion 15 surrounds the recess 14 and forms the apex 11E of the micro-protrusion in a tube-like form in this example.

In the decorative region 10 in this embodiment, substantially all of the micro-protrusions 11 disposed therein are each provided with the recess 14 and the wall portion 15.

When such micro-protrusions 11 are irradiated with light, their outer surfaces 11s diffuse the irradiated light. This helps to make the decorative region 10 matte-black. The light irradiated to the apex 11E is absorbed by the recess 14 and reflected by the upper end surface 15S of the wall portion 15 only, therefore, the apex 11E may be seen as black or dark.
Thus, the contrast with the non-decorative region 9 is increased, and the visibility of the decorative region 10 is improved.

This effect is more effectively exhibited by disposing the micro-protrusions 11 at a density of from 2 to 10 micro-protrusions 11 per 1 sq.mm.

Figure 3A:
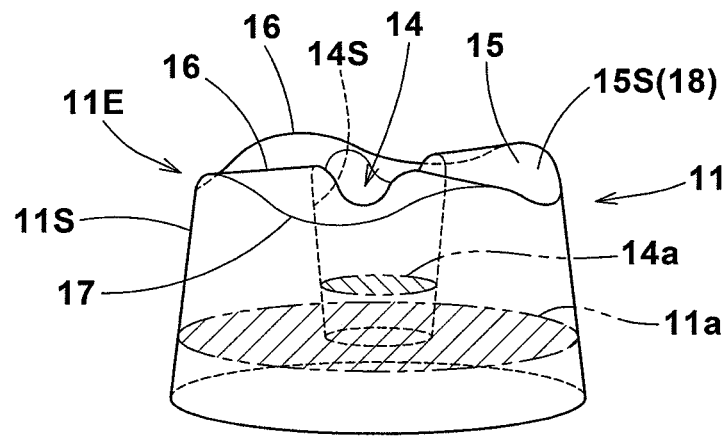
FIGS. 3A and 3B are a perspective view and a side view of an example of the micro-protrusion shown in FIG. 1.

FIG. 3A is a perspective view of the micro-protrusion 11. As show in FIG. 3A, the wall portion 15 of the micro-protrusion 11 is provided with at least two peak points 16 at which the protruding amount of the micro-protrusion 11 is local maximum or relative maximum.
In this embodiment, the wall portion 15 is tubular, therefore, in the circumferential direction, the peak points 16 alternate with bottom points 17 at which the protruding amount of the micro-protrusion 11 is local minimum or relative minimum.

In this embodiment, the above-said at least two peak points 16 have the same protruding amount. In other words, at the above-said at least two peak points 16, the protruding amount becomes maximum (or absolute maximum).

In this embodiment, further, the above-said bottom points 17 have the same protruding amount. In other words, at the above-said bottom points 17, the protruding amount becomes minimum (or absolute minimum).

Figure 3B:
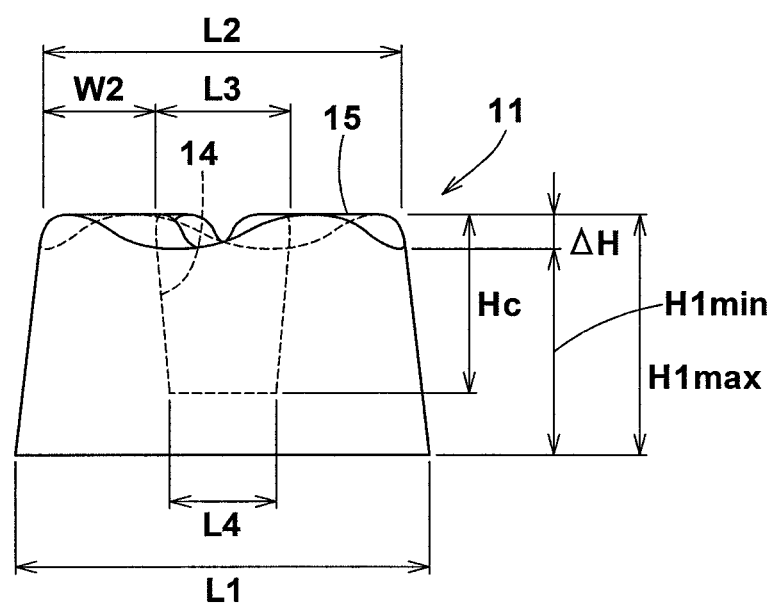

However, the peak points 16 may have different protruding amounts. Also, the bottom points 17 may have different protruding amounts. These may be applied to further examples of the micro-protrusion 11 described hereinafter.
In this embodiment, the upper end surface 15S of the wall portion 15 is a wavy curved surface 18 passing through the peak points 16 and the bottom points 17 smoothly curving in a wavy form as shown in FIG. 3A and FIG. 3B.

Figure 4:
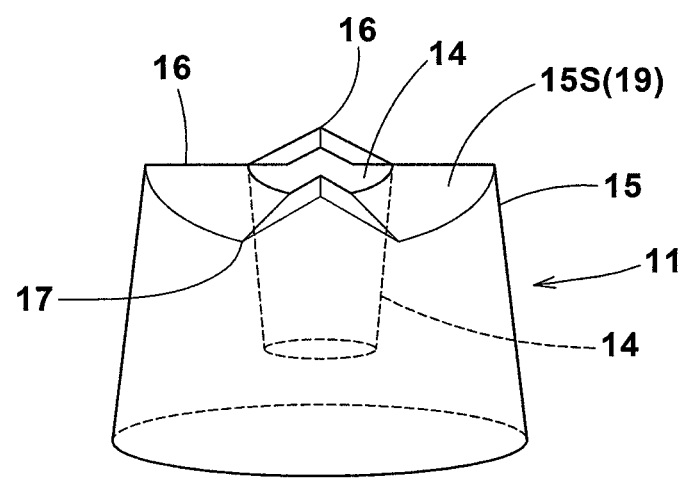
FIG. 4 is a perspective view of another example of the micro-protrusion.

However, it is also possible that the upper end surface 15s of the wall portion 15 is, as shown in FIG. 4, a polygonally-bent surface 19 made up of flat surfaces inclined and extending between the peak points 16 and the bottom points 17.

Since the upper end surface 15S of the wall portion 15 is formed by the surface having the two or more peak points 16 as explained above, the upper end surface 15S also causes diffusion of light and helps to make the hue of the protrusion's apex 11E further blackish.

In the present invention, in comparison with the circular-truncated-cone-like micro-protrusion which is not provided with the recess 14 at the upper end, it is possible to make the decorative region 10 more matte-black, owing to the synergistic effect of
the diffusion of light due to the outer surfaces 11s of the micro-protrusions 11,
the absorption of light due to the recesses 14, and
the diffusion of light due to the upper end surfaces 15S of the wall portions 15 as explained above.
As a result, the contrast of the decorative region 10 with the non-decorative region 9 is increased and the visibility of the non-decorative region 9 is improved.

It is preferable that the number of the peak points 16 formed in the upper end surface 15S of the wall portion 15 is set in a range from 3 to 6 in order to increase the effect of diffusing the irradiated light.

The micro-protrusion 11 has a contour 11a of a transverse section thereof taken perpendicularly to the protruding-height direction. The recess 14 preferably includes a centroid of the contour 11a.

The contour 11a is preferably a circle or an oval.

When the contour 11a is a circle, the irradiation light from all directions is diffused in the same manner irrespectively of the directions, that is, the above-said effect is non-directional, therefore, the contrast can be stably increased.

When the contour 11a is an oval, the effect of diffusing the irradiated light is varied depending on the irradiation directions, for example, it is possible to make the contrast different between an irradiation direction along the major axis of the oval and an irradiation direction along the minor axis of the oval, that is, the contrast of the decorative region 10 is provide with a directional dependency, therefore, it is possible to give a kind of unpredictability to the appearance of a marking made up of the decorative region 10 and the non-decorative region 9.

It is preferable that the contour 11a of the transverse section of the micro-protrusion 11 is made smaller in its upper end portion (on the protrusion's apex 11E side) than in its lower end portion (on the protrusion's root side).
The rigidity of such micro-protrusion 11 becomes higher in the lower end portion, and its deformation is suppressed, therefore, the micro-protrusion 11 is prevented from tearing off and cracking, and the improved visibility can be maintained for a long period term.

In this embodiment, the contour 11a of the transverse section of the micro-the protrusion 11 is continuously decreased from the lower end to the upper end. More specifically, the external form of the micro-protrusion 11 is tapered from the lower end to the upper end, namely, over the entire protruding height. The external form is however, not to be limited thereto.

It is preferable that, as shown in FIG. 3B, the maximum width L1 of the micro-protrusion 11 is 0.30 to 1.00 mm. The maximum width L1 occurs at the lower end of the micro-protrusion 11. This makes it possible to secure a large shadow of the micro-protrusion 11 by the irradiated light.
If the maximum width L1 is less than 0.30 mm, then the rigidity of the micro-protrusion 11 is decreased, therefore, there is a possibility that cracks and torn-off becomes easily occur.
If the maximum width L1 is more than 1.00 mm, there is a possibility that the light reflected by the outer surface 11S of the micro-protrusion 11 is increased, and the contrast with the non-decorative region 9 is decreased.

In order to effectively derive the above-said advantageous effects, it is preferred that the minimum width L2 of the micro-protrusions 11 is from 0.25 to 0.95 mm. The minimum width L2 occurs the upper end of the micro-protrusion 11. Thereby, it is possible to provide a part becoming darker while maintaining the rigidity.

The micro-protrusion 11 has a maximum (largest) height H1max at a peak point or peak points 16, and a minimum (smallest) height H1min at a bottom point or bottom points 17.

Preferably, the maximum height H1max is from 0.20 to 0.60 mm. If the maximum height H1max is less than 0.20 mm, then the micro-protrusion 11 becomes too low to exert the light diffusion effect, therefore, it becomes difficult to obtain a desired contrast. If the maximum height H1max is more than 0.60 mm, the micro-protrusion 11 is liable to be damaged because of its height.

Preferably, the minimum height H1min is from 0.10 to 0.50 mm. The difference dH=(H1max−H1min) between the maximum height H1max and the minimum height H1min is preferably from 0.10 to 0.40 mm. If the difference dH is less than 0.10 mm, it becomes difficult to obtain the light diffusion effect at the upper end surface 15S of the wall portion 15. If more than 0.40 mm, damage is liable to occur at the peak point 16.

It is preferable that the thickness W2 of the wall portion 15 in the upper end is not more than 0.20 mm. If the thickness W2 is more than 0.20 mm, then the recess 14 becomes small. As a result, there is a tendency that the effect to make the micro-protrusion 11 further blackish is decreased.

It is preferable that the thickness W2 is at least 0.05 mm. If the thickness W2 is less than 0.05 mm, the rigidity of the micro-protrusion 11 becomes low, and the micro-protrusion 11 is liable to be damaged.

The recess 14 has a contour 14a in its transverse section perpendicular to its depth direction which is preferably a circle or an oval as shown in FIG. 3A. (Here, the depth direction is a direction parallel to the above-said protruding-height direction of the micro-protrusion.)
Such recess 14 can maintain a high rigidity of the micro-protrusion 11, and helps to make the micro-protrusion 11 further blackish by absorbing light from various directions. In this embodiment, the contour 14a of the recess 14 in its transverse section is a circle.

When the contour 14a is an oval, the effect of diffusing the irradiated light is varied depending on the irradiation directions, therefore, it may be possible to give a kind of unpredictability to the appearance of a marking made up of the decorative region 10 and the non-decorative region 9.

It is preferable that the contour 14a of the recess 14 in its transverse section is larger in its upper end side than its lower end side to have higher rigidity in the lower end side and thereby suppress deformation of the micro-protrusion 11. Thus, tearing-off and cracking may be prevented.
In this embodiment, the contour 14a of the transverse section is continuously increased from the lower end toward the upper end. More specifically, in the micro-protrusion 11 in this embodiment, the inner surface 14s of the recess 14 is tapered from the upper end to the lower end over the entire length or depth although the contour 14a of the transverse section is not limited to such configuration.

It is preferable that, as shown in FIG. 3A, the depth HC of the recess 14 measured from the peak point 16 with the maximum protruding amount (or maximum height H1max) is in a range from 15% to 100% of the maximum height H1max of the micro-protrusion 11.
If less than 15%, the light is liable to be reflected by the bottom surface of the recess 14, and the effect of making the micro-protrusion 11 further blackish may be decreased.
If more than 100%, the rigidity of the micro-protrusion 11 becomes insufficient, and the micro-protrusion 11 is liable to be damaged. Therefore, it is preferable that the depth HC is set to be not more than 90% of the maximum height H1max.
It is also preferable that the depth HC is set in a range from 0.15 to 0.60 mm.

It is preferable that the maximum width L3 of the recess 14 is set in a range from 0.10 to 0.90 mm. The recess 14 has the maximum width L3 at its upper end.
If the maximum width L3 is less than 0.10 mm, the effect of absorbing light by the recess 14 tends to become less.
If the maximum width L3 is more than 0.90 mm, the rigidity of the micro-protrusion 11 is decreased, and the micro-protrusion 11 becomes liable to be damaged.

It is not essential, but preferable that the minimum width L4 of the recess 14 is not more than 100%, more preferably not more than 70% of the maximum width L3. The recess 14 has the minimum width L4 at its lower end.

It is preferable that, as shown in FIG. 2, the part of the decorative region 10 other than the micro-protrusions 11 includes a concavo-convex surface 25 whose 10-point average roughness (Rz) is 0.01 to 0.05 mm. Such concavo-convex surface 25 may create shadows on the decorative region 10 and helps to make this region further dark. Further, such concavo-convex surface 25 increases the rigidity of the decorative region 10 and suppresses the micro-protrusions 11 from being torn off. The 10-point average roughness (Rz) is measured according to Japanese Industrial Standard B0601(1994).

It is preferable that the arrangement pitches of the micro-protrusions 11 are set in a range from 0.6 to 1.0 mm. Here, the arrangement pitches are defined by the distances between the centroids of the above-said transverse sections of the micro-protrusions taken at the respective lower ends. In this embodiment, the micro-protrusions 11 are arranged in a staggered manner. But, the micro-protrusions 11 may be arranged at nodes of an orthogonal grid for example.

The arrangement pitches may be varied within the above-said range. In this case, the micro-protrusions 11 may be randomly-arranged.

The micro-protrusions 11 are preferably disposed in an area of not less than 50% more preferably not less than 75%, most preferably 100% of the decorative region 10.

When the micro-protrusions 11 having a constant size are closely arranged, such decorative region 10 may be seen further darker and the contrast becomes clear.

FIG. 4 is a perspective view showing another example of the micro-protrusion 11, wherein the upper end surface 15s of the wall portion 15 surrounding the recess 14 is formed as a polygonally-bent surface 19 made up of flat surfaces inclined and connecting between the peak points 16 and the bottom points 17. In this case too, the upper end surface 15s exerts the same effects as the curved surface 18 shown in FIG. 3.

FIG. 5A shows another example of the micro-protrusion 11 in its side view (upper side of figure) and the contour 11a (lower side of figure) of the transverse section taken at the position of line A-A of the side view.

This example shows that the contour 11a of the transverse section of the micro-protrusion 11 has a constant size from its lower end to its upper end. That is, the micro-protrusion 11 is formed in the form of a cylinder.

Further, in this example, the contour 14a of the recess 14 in its transverse section also has a constant size from its lower end to the upper end.

FIG. 5B shows another example of the micro-protrusion 11 in its side view (upper side of figure) and the contour 11a (lower side of figure) of the transverse section taken at the position of line A-A of the side view.

This example shows that the contour 11a of the transverse section of the micro-protrusion 11 is decreased in the size from its lower end toward its upper end in a stepwise manner at a position P. Thus, a step is formed at the position P.

The upper part Y1 and the lower part Y2 of the micro-protrusion 11 than the position P are each formed in the form of a cylinder. Such micro-protrusion 11 is possible to exert the effect to make the micro-protrusion 11 further blackish, and enhance the contrast of the decorative region with the non-decorative region, while maintaining high rigidity similarly to the tapered micro-protrusions 11 as shown in FIG. 3.

Further, it may be possible to form one or each of the parts Y1 and Y2 in a tapered manner similarly to FIG. 3.

In this example, one step is formed at the position P, but two or more steps may be formed at different positions.

FIG. 5c shows another example of the micro-protrusion 11 in its side view (upper side of figure) and the contour 11a (lower side of figure) of the transverse section taken at the position of line A-A of the side view.

This example is a modification of the example shown in FIG. 5B. In the example shown in FIG. 5B, the center of the upper part Y1 is aligned with that of the lower part Y2. But, in this example, the center of the upper part Y1 is shifted from that of the lower part Y2.

At the position P at which the size of the contour 11a is changed in a stepwise manner, a part K of the contour 11a of the part Y1 coincides with a part K of the contour 11a of the part Y2. With such configuration, the contrast of the decorative region may be provided with a directional dependency, therefore, it is possible to give a kind of unpredictability to the appearance of a marking made up of the decorative region and the non-decorative region.

FIG. 6A shows another example of the micro-protrusion 11 in its side view (upper side of figure) and the contour 14a (lower side of figure) of the recess 14 in its transverse section taken at the position of line B-B of the side view.

This example shows that the contour 14a of the transverse section of the recess 14 is increased in the size from its lower end toward its upper end in a stepwise manner at a position P2. Thus, a step is formed at the position P2.

In this example, one step is formed at the position P2, but two or more steps may be formed at different positions. Such recess 14 may also exert the effect to absorb the irradiated light and enhance the contrast of the decorative region with the non-decorative region, while maintaining high rigidity similarly to the inversely-tapered recess 14 as shown in FIG. 3.

FIG. 6B shows another example of the micro-protrusion 11 in its side view (upper side of figure) and the contour 14a (lower side of figure) of the recess 14 in its transverse section taken at the position of line B-B of the side view.

In this example, at the position P2 at which the size of the contour 14a is changed in a stepwise manner, a part K of the contour 14a of the upper part than the position P2 coincides with a part K of the contour 14a of the lower part than the position P2.

Figure 7A:
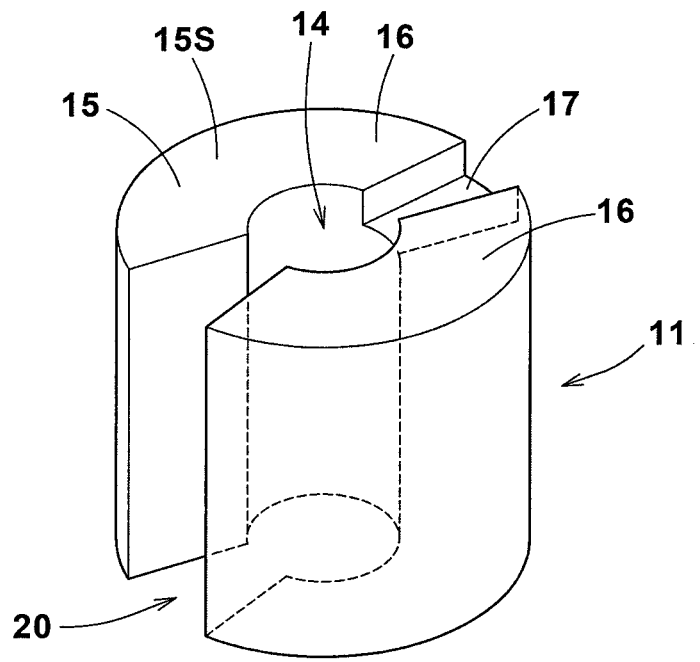
FIGS. 7A and 7B are a perspective view and a side view of yet still another example of the micro-protrusion.
Figure 7B:
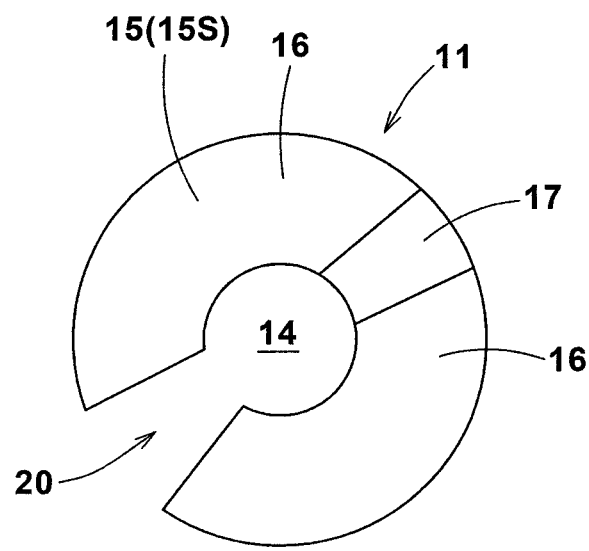

FIGS. 7A and 7B show a further example of the micro-protrusion 11, wherein the wall portion 15 has two peak points 16 and one bottom point 17. Specifically, the wall portion 15 is not tubular. More specifically, the wall portion 15 does not completely surround the recess 14. The wall portion 15 has an interruption in its circumferential direction, and a gap 20 is formed. Thus, its transverse section lower than the bottom point 17 is C-shaped.

In this example, the upper end surface 15S of the wall portion 15 is made up of
two flat faces defining the two peak points 16,
one flat face defining the one bottom point 17, and
two flat faces extending between the two flat faces and the one flat face in parallel with the protruding-height direction.

The decorative region 10 is formed from a rubber material of a rubber member of the tire 1 which forms, for example, the outer surface 3a of the tire 1.

For example, in a method of forming the decorative region 10, the decorative region 10 and non-decorative regions 9 are formed by using a mold for vulcanization-molding the tire, of which inner surface is provided with a reverse pattern of the non-decorative regions 9 and the decorative region 10 inclusive of the reverse pattern of the micro-protrusions 11. Thus, during vulcanization-molding the tire 1, the decorative region 10 is formed.

Further, in another method of forming the decorative region 10, the decorative region 10 is formed on the outer surface of the vulcanized tire 1 by computer control machining or computer control laser machining.

While detailed description has been made of preferable embodiments of the present invention, the present invention can be embodied in various forms without being limited to the illustrated embodiments.

Comparison Test

Pneumatic tires each having a sidewall portion provided in its outer surface with the decorative region 10 and the non-decorative regions 9 disposed therein as shown in FIG. 1 and FIG. 2 were experimentally manufactured and tested for the visibility of the non-decorative regions.
All of the pneumatic tires, namely, working examples (Ex. 1-Ex. 4) and comparative examples (Ref. 1 and Ref. 2) were identical except for the specifications shown in Table 1.

<Visibility Test>

Each test tire was visually observed by observers at a distance of 1 meter sideways from the sidewall portion, and the visibility was evaluated based on the contrast of the decorative region. The results are indicated in Table 1 by an index based on comparative example Ref. 1 being 100, wherein the larger the value, the higher the contrast, namely the better the visibility.

TABLE 1

| <micro-protrusions> | Tire | | | | | |
|---|---|---|---|---|---|---|
| | Ref. 1 | Ref. 2 | Ex. 1 | Ex. 2 | Ex. 3 | Ex. 4 |
| side surface's configuration | tapered | | | | stepped | tapered |
| recess | absent | | present | | | |
| number of peak point(s) | 0 | | 4 | | | |
| upper end surface's configuration | flat face perpendicular to protruding-height direction | | curved surface FIG. 3A | polygonally-bent surface FIG. 4 | curved surface FIG. 3A | |
| maximum height H1max (mm) | | | | 0.3 | | |
| the minimum height H1min (mm) | 0.3 | | | | 0.2 | |
| difference dH (mm) | 0 | | | | 0.1 | |
| minimum width L2 (mm) | | | | 0.41 | | |
| maximum width L1 (mm) | | | | 0.54 | | |
| recess's configuration | — | | inversely-tapered | | stepped | |
| recess's depth Hc (mm) | — | | 0.3 | | | |
| recess's maximum width L3 (mm) | — | | 0.31 | | | |
| recess's minimum width L4 (mm) | — | | 0.2 | | | |
| thickness W2 (mm) | — | | 0.05 | | | |
| visibility | 100 | 120 | 130 | 130 | 130 | 130 | micro-protrusions' arrangement pitches: 0.6

It was confirmed that the tires according to the present invention were improved in the visibility.

REFERENCE SIGNS LIST 1 tire
1a outer surface
10 decorative region
11 micro-protrusion
11a contour of transverse section
11E protrusion's apex
14 recess
14a contour of transverse section
15 wall portion
15S upper end surface
16 peak point
17 bottom point
18 curved surface
19 polygonally-bent surface
19a inclined flat surface
25 concavo-convex surface

The invention claimed is:

1. A tire having a visible outer surface comprising
a decorative region provided with a plurality of micro-protrusions each comprising a recess and a wall portion,
said wall portion surrounding the recess and forming a protrusion's apex having an upper end surface, and
said upper end surface comprising at least two peak points in a protruding-height direction of a micro-protrusion, at which a protruding height of the wall portion becomes a local maximum, wherein in the decorative region, 2 to 10 micro-protrusions are disposed per 1 sq.mm.

2. The tire according to claim 1, wherein
in said wall portion, the peak points alternate in a circumferential direction with bottom points at which the protruding height of the wall portion becomes a local minimum.

3. The tire according to claim 2, wherein
the upper end surface of the wall portion is a surface continuously curved and smoothly connecting the peak points and the bottom points.

4. The tire according to claim 2, wherein
the upper end surface of the wall portion is a polygonally-curved surface made up of surfaces inclined and connecting between the peak points and the bottom points.

5. The tire according to claim 1, wherein
the micro-protrusions include a micro-protrusion whose contour in its transverse section perpendicular to its protruding-height direction is a circle or alternatively an oval.

6. The tire according to claim 1, wherein
the micro-protrusions include a micro-protrusion whose contour in its transverse section perpendicular to its protruding-height direction is smaller in its upper end side than its lower end side in the protruding-height direction.

7. The tire according to claim 6, wherein
the micro-protrusion whose contour is smaller in its upper end side than its lower end side, comprises a part in the protruding-height direction in which the contour becomes continuously smaller toward an upper end.

8. The tire according to claim 6, wherein
the micro-protrusion whose contour is smaller in its upper end side than its lower end side, comprises a part in the protruding-height direction at which the contour becomes smaller in a stepwise manner toward an upper end.

9. The tire according to claim 8, wherein
in said part at which the contour in the transverse section of the micro-protrusion becomes smaller in the stepwise manner toward the upper end, the contour changes from a larger contour to a smaller contour, and a part of the larger contour coincides with a part of the smaller contour.

10. The tire according to claim 1, wherein
a contour of the recess in its transverse section perpendicular to its depth direction is a circle or alternatively an oval.

11. The tire according to claim 1, wherein
a contour of the recess in its transverse section perpendicular to its depth direction is larger in its upper end side than its lower end side in the depth direction.

12. The tire according to claim 11, wherein
the recess comprises a part in which the contour of the recess in its transverse section becomes continuously larger toward an upper end.

13. The tire according to claim 11, wherein
the recess comprises a part at which the contour of the recess in its transverse section becomes larger in a stepwise manner toward an upper end.

14. The tire according to claim 13, wherein
in said part at which the contour of the recess in its transverse section becomes larger in the stepwise manner toward the upper end, the contour changes from a larger contour to a smaller contour, and a part of the larger contour coincides with a part of the smaller contour.

15. The tire according to claim 1, wherein
the decorative region other than the micro-protrusions comprises a concave-convex surface whose 10-point average roughness (Rz) is in a range from 0.01 to 0.05 mm.

16. The tire according to claim 1, wherein
said at least two peak points have a same protruding height.

* * * * *